US006236029B1

(12) United States Patent
Leurquin

(10) Patent No.: US 6,236,029 B1
(45) Date of Patent: May 22, 2001

(54) APPARATUS FOR SOLDERING FLAT RECTANGULAR CONNECTORS AND METHOD USING SAME

(75) Inventor: Michel Leopold Marie Louis Leurquin, Nivelles (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/294,015

(22) Filed: Apr. 19, 1999

(30) Foreign Application Priority Data

Apr. 20, 1998 (EP) ........................................ 98400969

(51) Int. Cl.[7] ........................................ B23K 1/002
(52) U.S. Cl. ........................................ 219/616; 29/854
(58) Field of Search ........................................ 219/616, 605, 219/615, 617, 636; 174/36, 35 C; 29/854

(56) References Cited

U.S. PATENT DOCUMENTS

| | | | | |
|---|---|---|---|---|
| 2,759,161 | * | 8/1956 | Berg | 174/35 C |
| 3,758,916 | * | 9/1973 | Wetmore | 174/36 |
| 4,595,724 | * | 6/1986 | Koblitz | 29/854 |
| 4,991,288 | | 2/1991 | Scholz . | |
| 5,032,703 | * | 7/1991 | Henschen et al. | 219/636 |
| 5,093,545 | * | 3/1992 | McGaffigan | 219/616 |
| 5,098,319 | * | 3/1992 | McGaffigan et al. | 219/605 |
| 5,519,192 | * | 5/1996 | Childs et al. | 219/616 |

FOREIGN PATENT DOCUMENTS 42 23 146 A1 1/1994 (DE) .

OTHER PUBLICATIONS

"Operating and Maintenance Manual", A–400 Super Heater-Mark II heating gun of the Raychem Corporation—Electronics Group, Menlo Park, California.

* cited by examiner

*Primary Examiner*—Teresa Walberg
*Assistant Examiner*—Quang Van
(74) *Attorney, Agent, or Firm*—Sughrue, Mion, Zinn, Macpeak & Seas, PLLC

(57) ABSTRACT

A method and apparatus for soldering the core end (3) of an electrical wire (4) to a tinplated spoon (2) of a contact terminal of a connector (1) by using a soldering sleeve (5) that is a shrinkable tube including meltable soldering material. The method includes the following steps:

pre-soldering (6, 8, F1; 7, 9, F2) the core end of the wire to the spoon;

positioning the soldering sleeve (5) over the pre-soldered core end and spoon; and heating, preferably by induction, the soldering sleeve in order to melt the soldering material included therein so as to perform the 'real' soldering. Owing to this method, including the pre-soldering operation, and to the apparatus specifically design therefore, the action of the operator is facilitated in that he no longer the maintain together the core end, the spoon and the soldering sleeve while heating the whole during a relatively long time. Also the quality of the resulting soldering is thereby improved.

22 Claims, 3 Drawing Sheets

APPARATUS FOR SOLDERING FLAT RECTANGULAR CONNECTORS AND METHOD USING SAME

BACKGROUND OF THE INVENTION

The present invention relates to a method for soldering the core end of an electrical wire to a contact terminal of a connector by means of a soldering sleeve, said soldering sleeve being a shrinkable tube including meltable soldering material, and said method comprising the steps of:

positioning said core end onto said contact terminal;

positioning said soldering sleeve so as to cover said core end and said contact terminal; and heating said soldering sleeve in order to melt the soldering material included therein and so to solder said core end to said contact terminal.

Such a method is already known in the art, e.g. from "*Operating and Maintenance Manual*" of the AA-400 Super Heater-Mark III heating gun of the Raychem Corporation™—Electronics Group, located at 300 Constitution Drive, Menlo Park—Calif. 94025. Therein is described the above method that consists of positioning, by an operator, the electrical wire on a positioning tool in order to bring the core end of the wire into contact with the contact terminal while covering the whole with the shrinkable soldering sleeve. At the same time, the operator heats the soldering sleeve with a heating gun. By this heating, the solder of the sleeve melts and provides a soldered connection between the contact terminal and the core end of the wire. Secondly the sleeve shrinks over the soldered connection.

In this known method, the positioning of the core end of the wire onto the contact terminal must be very precise and, because it is covered by the soldering sleeve and thus no longer visible, it is very difficult for an operator to maintain this position during the whole soldering process. The result is thus very dependent of the ability and experience of the operator.

The quality of the resulting soldered connection and of the shrinked down sleeve is also very much influenced by the human factor. Indeed, the heating with a heating gun is a relatively long and fastidious operation during which it is not easy to obtain a uniform heat. Generally only the side near to the gun gets the necessary calories to heat the connection. This is particularly true with hot air guns that also have the particularity that the heating resistors thereof degrade slowly whereby, as result, it becomes rapidly harder to get the same result even if the gun is still in the calibration tolerance. As a consequence, the operator has to adapt to the changing performance of the heating gun.

SUMMARY OF THE INVENTION

An object of the present invention is to provide a soldering method as described above but wherein the human ability is of less importance, whereby the reproducibility may be increased as well as the quality of the soldered joint.

According to the invention, this object is achieved due to the fact that said method further includes the step of pre-soldering said core end of the electrical wire to said contact terminal prior to positioning said soldering sleeve over said core end and said contact terminal.

In this way, during the pre-soldering operation, the operator only has to position the core end of the electrical wire onto the contact terminal, without taking into account the shrinkable soldering sleeve. The pre-soldered joint is continuously visible and the pre-soldering operation is relatively fast. This operation is thus easy to reproduce with a constant quality.

The next heating of the soldering sleeve is also facilitated because the core end and the contact terminal are then already interconnected and well positioned.

Since the human ability is of minor importance in the present process, the reproducibility is very high.

The quality of the resulting soldering is also increased with respect to that of the above known method. Indeed, in the known method, it has been found by metallographic investigation that solder from the soldering sleeve is located between the contact terminal and the core end. With the present method however, the contact terminal and the core end are in contact with each other and are imbedded in the solder in a homogenous way. This provides a better electrical contact.

Another advantage of the pre-soldering operation is that it is reversible. This means that the core end of the electrical wire may be de-soldered and correctly repositioned onto the contact terminal if necessary.

The pre-soldering operation of the present invention is further facilitated in that said contact terminal has a spoon plated with a meltable soldering material and to which said core end is pre-soldered.

Preferably, said spoon is a tinplated spoon.

Another characteristic feature of the present method is that said step of pre-soldering said core end to said contact terminal is realized according to the soldering by resistance method wherein an electrical current flows via said core end and said contact terminal pressed against each other.

The 'soldering by resistance' method is known as giving good results and suits perfectly to the pre-soldering step of the present soldering method.

Also another characteristic feature of the present invention is that said soldering sleeve is heated by induction heating.

Induction heating is known as providing the most homogenous soldering.

Preferably, the inductive heating is provided in an oven wherein said connector is inserted with the electrical wire already pre-soldered to the contact terminal.

In a more general application of the present method, said connector is provided with a plurality of contact terminals to which core ends of different electrical wires are successively pre-soldered and soldered.

In more detail, said connector is a rectangular flat connector provided with a plurality of contact terminals arranged in a row and to which core ends of different electrical wires are pre-soldered and soldered according to the present method.

It is to be noted that the heating by induction can not be applied to the above known method where three items have to be positioned with respect to each other prior to the soldering operation for each of the contact terminals of the connector.

Yet another characteristic feature of the present invention is that said soldering sleeve is constituted by a tube that includes the solder material and that is adapted to shrink over the joint core end and contact terminal during the step of heating said soldering sleeve.

By using the present method, the risk of altering the structure of the shrinkable tube of the sleeve is much lower than by using a heating gun, especially when the latter degrades as discussed above.

The present invention also relates to a soldering apparatus for soldering the core end of an electrical wire to a contact terminal of a connector by means of a soldering sleeve, said contact terminal being plated with a meltable soldering material and said soldering sleeve being a shrinkable tube also including meltable soldering material, said apparatus comprising:

a pre-soldering fool with pressure means adapted to press said core end and said contact terminal together, and with electrical means adapted to provide an electrical current flowing via said joint core end and contact terminal, so as to pre-solder them together according to the soldering by resistance method; and an inductive soldering tool adapted to heat by induction said soldering sleeve covering the pre-soldered core end and contact terminal in order to melt the soldering material included in said soldering sleeve and to shrink the shrinkable tube.

Such an apparatus is especially designed for operating according to the method of the present invention.

In more detail, the present apparatus is characterized in that said pressure means comprises electrical fingers adapted to press together said core end and said contact terminal, and in that said fingers are electrically conductive so that said current also flows through said fingers.

The fingers may for instance be driven by an engine so that a constant and repetitive pressure may be exerted on each core end and contact terminals of the connector.

The best pre-soldering is obtained with electrical fingers that have a relatively low resistivity body ending with a relatively high resistivity heating end that comes into contact with said core end and said contact terminal.

Furthermore, said pre-soldering tool further includes means to maintain said connector in place, and positioning means adapted to maintain said electrical wire in order to facilitate the positioning of said core end onto said contact terminal.

Said positioning means preferably comprises a V-groove shaped guide wherein the electrical wire is placed and maintained, for instance by an operator.

Since, in a more general application, said connector is provided with a plurality of contact terminals to which core ends of different electrical wires may be soldered, said pre-soldering tool further includes means adapted to displace said connector and thereby said contact terminals with respect to said core ends so as to bring each contact terminal and the corresponding core end at the height of the pressure means.

This facilitates the handling of the soldering apparatus, and thereby saves operational time.

In the present invention, said inductive soldering tool is an oven with means adapted to maintain said connector and said wires in place during the soldering operation. Said oven further comprises a high frequency generator to provide said heat by induction.

It is to be noted that said electrical wire may form part of a multi-conductor cable.

Further characteristic features of the present soldering method and apparatus are mentioned in the appended claims.

BRIEF DESCRIPTION OF THE DRAWING

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
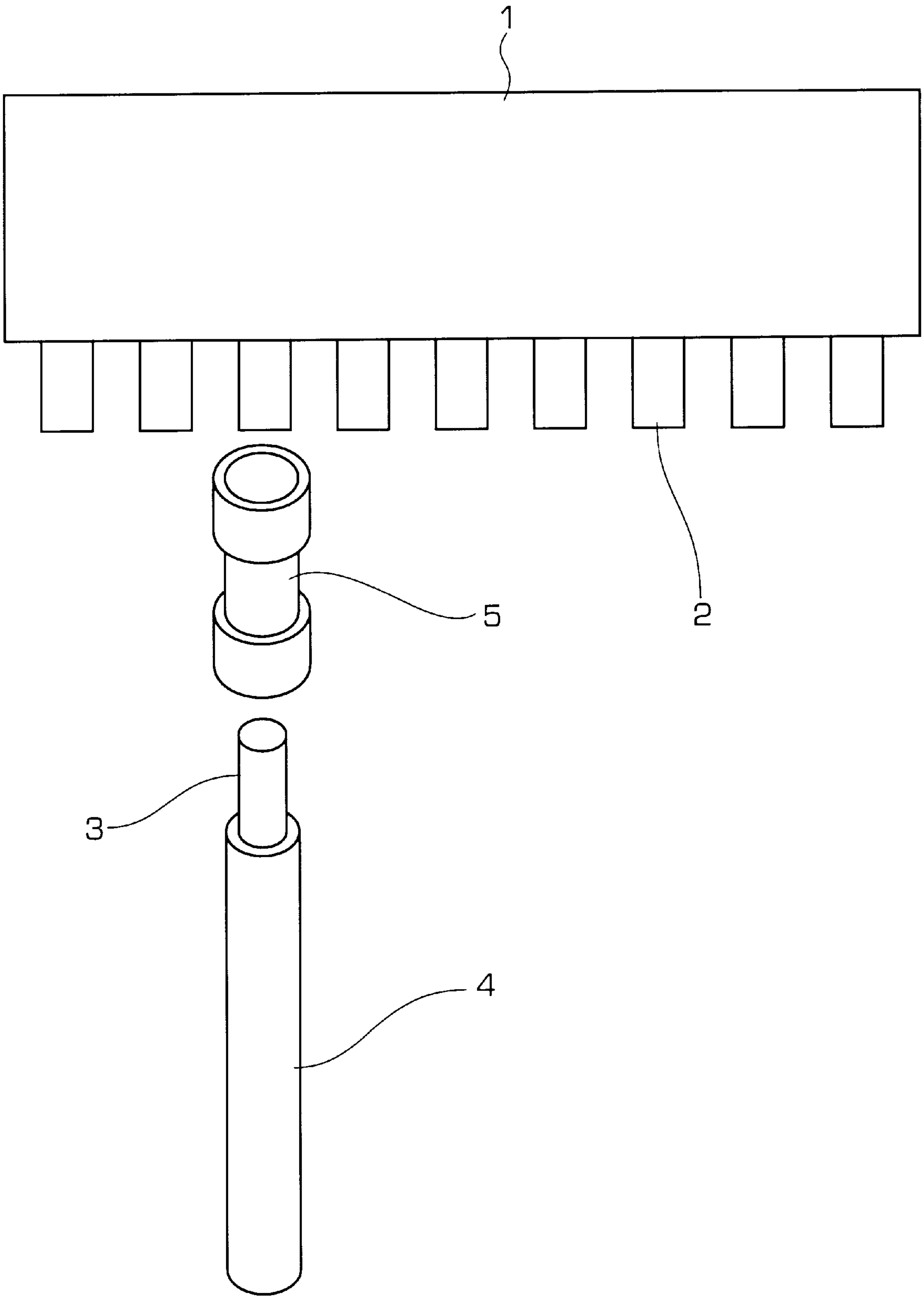
FIG. 1 shows a connector 1 with contact terminals, a soldering sleeve and an electrical wire 4 to be soldered together according to the present invention.

The present invention concerns the soldering of core ends of electrical wires to contact terminals of a connector. The connector may comprise only one contact terminal but, as shown on FIG. 1, it is preferably a rectangular flat connector 1 provided with a plurality of such contact terminals arranged in a row. Such a low profile rectangular design allows high packaging density while using lightweight materials, and is particularly applicable to aerospace applications. The connector is for instance of the type 16VE049001-5, 16VE049002-5, 16VE049003-5 or 16VE049004-5 in the series MTC100 of Raychem Corporation™. Each contact terminal of the connector 1 comprises a spoon 2 whereon the core end 3 of an electrical wire 4 will be soldered. The spoon 2 is preferably plated with meltable soldering material such as tin, and is therefore hereafter more generally called "tinplated spoon". The core end 3 may be bared or plated, e.g. as a silver coated core end. The wire 4 may be a single conductor or from a multi-conductor cable, as available from different providers. In all the cases, the core section of the wire 4 should be compatible with the present soldering method.

As will be explained in more detail later, the soldering is completed by a soldering sleeve 5. The soldering sleeve 5 is constituted by a tube that includes solder material and that shrinks when heated. An example of such a soldering sleeve is for instance a tube of KYNAR™ that is of the type 16VE049012-1 in the series CTA-0025 of Raychem Corporation™. The chemical composition of KYNAR™ is $(CH_2—CF_2)n$.

The present method of soldering consists of attaching by a first pre-soldering operation the wires to the connector before the second 'real' soldering that handles the complete connector with all its wires in one single second operation.

Figure 2:
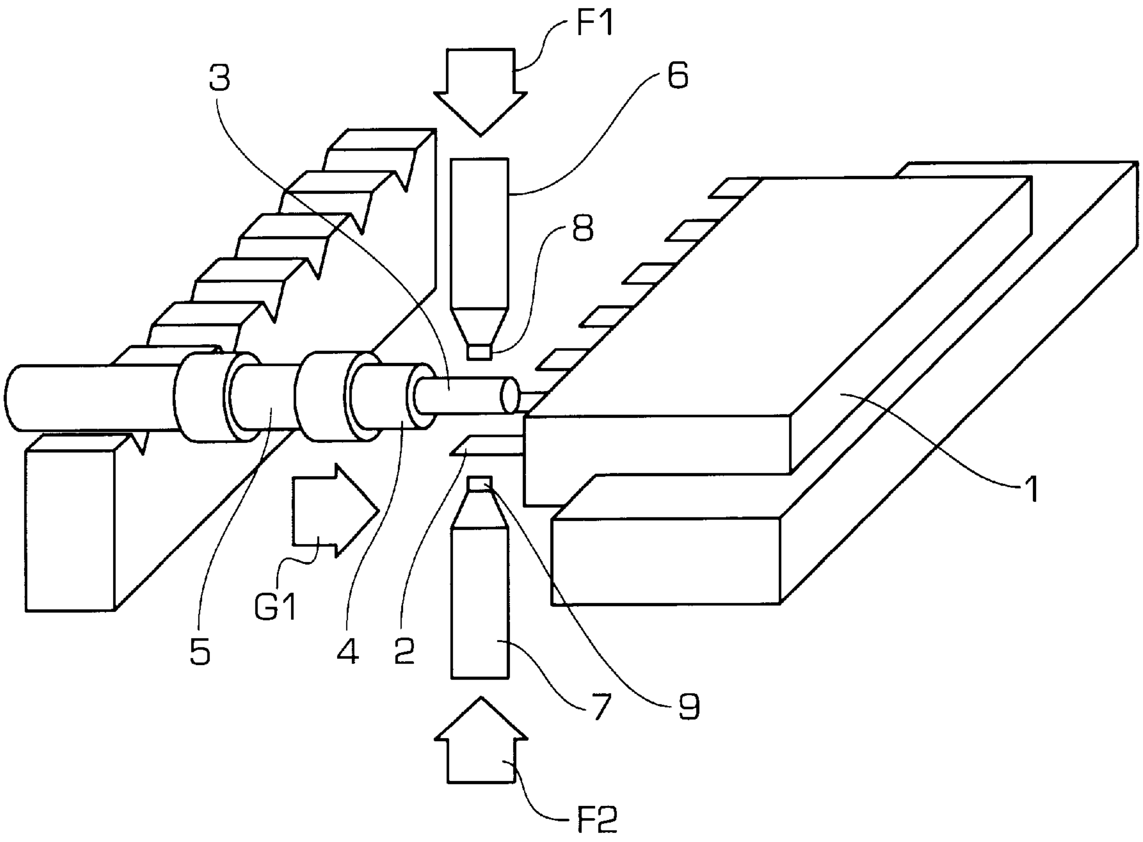
FIG. 2 shows the pre-soldering operation of the items of FIG. 1.

The first main operation is thus a pre-soldering that is performed by using a positioning and pre-soldering tool schematically represented at FIG. 2. This pre-soldering tool is a heating tool used to make a preliminary solder connection between the tinplated spoon 2 of the contact and the core end 3 of the wire 4 that has to be attached at this point.

The positioning and pre-soldering tool has means to maintain the connector 1 in place and to position the electrical wire 4 so that its core end 3 is located on the spoon 2. The device to position the wire 4 consists of a V-groove shaped guide, e.g. a metallic support, wherein this wire is placed and maintained by an operator.

The preliminary connection is realized by melting the solder that is present on the tinplated spoon 2 and by attaching thereto the core end 3 of the wire 4 by a light solder connection. To make this connection, the 'soldering by resistance' technique is used. In this technique, an electric current flows through the connection to be realized. The place where the resistance is the highest heats up and thereby melts the solder. To this end and by referring again to FIG.

2, the pre-soldering tool is provided with two pressure fingers 6 and 7 of which respective ends 8 and 9 are opposite to each other and between which the core end 3 and the spoon 2 are placed. The finger ends 6 and 7 are moved towards each other as indicated by the arrows F1 and F2 so as to bring the core end 3 and the spoon 2 into contact. Further, a pressure is exerted onto these joint items. A current is then applied to the pressure fingers 6 and 7 that are also electrically conductive. To realize a good pre-soldering operation, the heat needs to be concentrated at the ends 8, 9 of the electrical fingers 6, 7. Therefore, these fingers have a body with a low electrical resistivity and a heating end 8/ 9 with a higher electrical resistivity, the heating ends 8, 9 coming into contact with the core end 3 and the contact terminal or tinplated spoon 2. In a preferred embodiment, the heating ends 8, 9 are made of stainless steel. It has been found that the current may be identical for any section of wires, the connector 1 accepting obviously wires of different sections that are compatible with the present soldering method.

The same operation is repeated for all the wires to be connected to the connector 1. In order to facilitate the soldering of a connector with several contact terminals to which different electrical wires have to be soldered, the pre-soldering tool is provided with means (not shown) adapted to displace this connector 1, and thereby its contact terminals, with respect to the core ends of the corresponding wires. Each pair of core end 3 and spoon 2 to be joint by pre-soldering is then successively brought under the pressure fingers 6 and 7. As a result, all the wires that have a same stripped core end length have the same position onto the corresponding contact spoon.

Although this pre-soldering operation is reversible—the wires may be de-soldered at any moment—the connector with the wires attached thereto may be manipulated without risk of detaching these wires.

Figure 3:
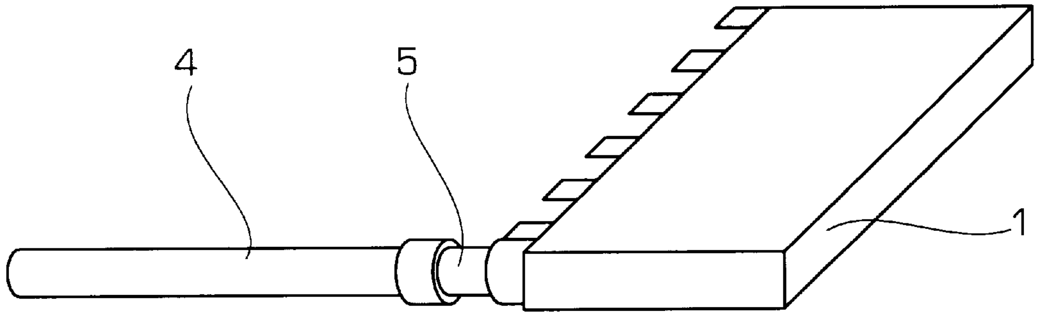
FIG. 3 shows the assembly of FIG. 2 after the pre-soldering operation.

It is to be noted that prior to performing this pre-soldering operation, the soldering sleeve 5 is preferably first engaged on the wire 4. The sleeve 5 should be slid there-over until it reaches a position where the heating of the pre-soldering tool has no effect on this sleeve. When the whole pre-soldering operation is completed, the soldering sleeves are slid, in the direction of the arrow G1, over their respective wires until they cover the pre-soldered core ends and spoons of the contacts. The result of this operation is shown on FIG. 3 for one single wire 4 connected to the connector 1.

Figure 4:
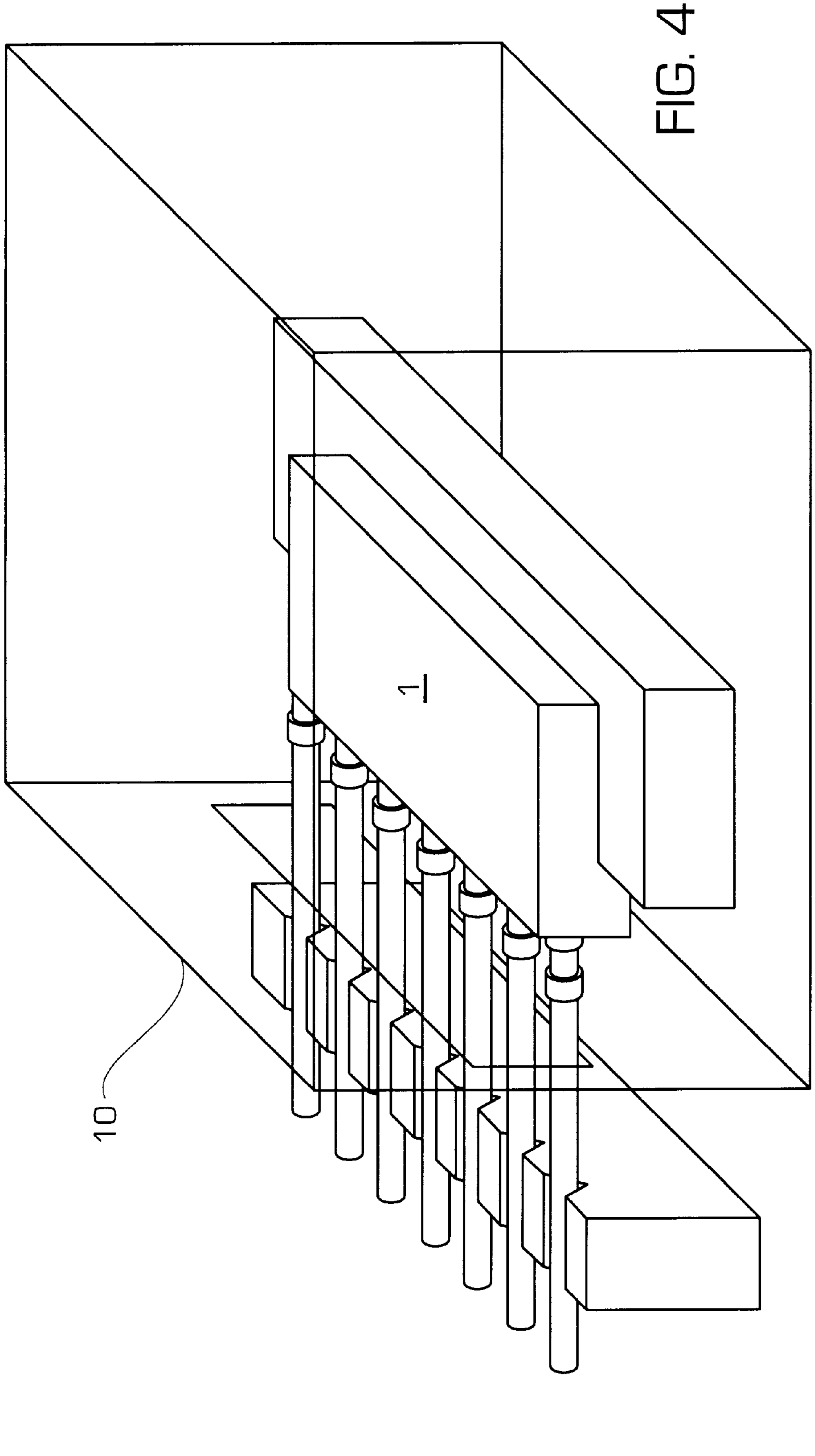
FIG. 4 represents an inductive soldering oven wherein the pre-soldered assembly of the preceding FIGs is inserted.

The second main operation is performed by a second soldering tool that will make the actual solder joint by using the soldering sleeve 5. This operation is based on heating, by induction, the connector 1 with the wires attached thereto and with the soldering sleeves positioned over the core ends and the spoons of the contacts. To this end, the assembly is placed in an induction oven 10 as shown on FIG. 4. The oven 10 is provided with a high frequency generator and with a system (both not shown) that maintains the wires and the connector 1 in place.

The power level of the generator is determined by the sections of the wires to be soldered. The time the assembly has to stay in the oven is about 30 seconds. Afterwards, some seconds are needed to cool down the solder and the operation is finished.

During this heating operation, the solder material included in the soldering sleeve 5 is melted. The solder thereby surrounds and embeds, for each wire, the pre-soldered spoon and core end. The soldered spoon and core end are then covered by the shrinked tube of the soldering sleeve 5. This shrinked tube protects the joint core end and spoon, even the whole contact terminal, against moisture and other external factors that may negatively affect the connection.

It is to be noted that, even for the spoons where no wire is connected, a soldering sleeve is anyway provided in order to protect the corresponding contact terminal.

While the principles of the invention have been described above in connection with specific apparatus, it is to be clearly understood that this description is made only by way of example and not as a limitation on the scope of the invention, as defined in the appended claims.

What is claimed is:

1. Method for soldering the core end of an electrical wire to a contact terminal of a connector by means of a soldering sleeve, said soldering sleeve being a shrinkable tube including meltable soldering material, and said method comprising the steps of:

positioning said core end onto said contact terminal;

positioning said soldering sleeve so as to cover said core end and said contact terminal; and heating said soldering sleeve in order to melt the soldering material included therein and so to solder said core end to said contact terminal, characterized in that said method further includes the step of pre-soldering said core end of the electrical wire to said contact terminal by pressing said core end and said contact terminal together prior to positioning said soldering sleeve over said core end and said contact terminal.

2. Method according to claim 1, characterized in that said contact terminal has a spoon plated with a meltable soldering material and to which said core end is pre-soldered.

3. Method according to claim 2, characterized in that said spoon is a tinplated spoon.

4. Method according to claim 1, characterized in that said step of pre-soldering said core end to said contact terminal is performed using the soldering by resistance method, wherein an electrical current flows via said core end and said contact terminal pressed against each other.

5. Method according to claim 1, characterized in that said soldering sleeve is heated by induction heating.

6. Method according to claim 5, characterized in that the inductive heating is provided in an oven wherein said connector is inserted with the electrical wire pre-soldered to the contact terminal.

7. Method according to claim 1, characterized in that said connector is provided with a plurality of contact terminals to which core ends of different electrical wires are successively pre-soldered and soldered.

8. Method according to claim 7, characterized in that said connector is a rectangular flat connector provided with a plurality of contact terminals arranged in a row and to which core ends of different electrical wires are pre-soldered and soldered according to the method of the preceding claims.

9. Method according to claim 1, characterized in that said soldering sleeve is constituted by a tube which includes the solder material and which shrinks over the joint core end and contact terminal during the step of heating said soldering sleeve.

10. Method according to claim 1, characterized in that said core end is silver coated.

11. Method according to claim 1, characterized in that said electrical wire forms part of a multi-conductor cable.

12. Soldering apparatus for soldering the core end of an electrical wire to a contact terminal of a connector by means of a soldering sleeve, said contact terminal being plated with a meltable soldering material and said soldering sleeve being a shrinkable tube also including meltable soldering material, said apparatus comprising:

a pre-soldering tool with pressure means for pressing said core end and said contact terminal together, and with electrical means for providing an electrical current flowing via said joint core end and contact terminal, so as to pre-solder them together according to the soldering by resistance method; and an inductive soldering tool which heats by induction said soldering sleeve covering the pre-soldered core end and contact terminal in order to melt the soldering material included in said soldering sleeve and to shrink the shrinkable tube.

13. Soldering apparatus according to claim 12, characterized in that said pressure means comprises electrical fingers which adapted press together said core end and said contact terminal, and in that said fingers are electrically conductive so that said current also flows through said fingers.

14. Soldering apparatus according to claim 13, characterized in that said electrical fingers have a relatively low resistivity body ending with a relatively high resistivity heating end that comes into contact with said core end and said contact terminal.

15. Soldering apparatus according to claim 12, characterized in that said pre-soldering tool further includes means for maintaining said connector in place, and positioning means for maintaining the position of said electrical wire in order to facilitate the positioning of said core end onto said contact terminal.

16. Soldering apparatus according to claim 15, characterized in that said positioning means comprises a V-groove shaped guide wherein the electrical wire is placed and maintained.

17. Soldering apparatus according to claim 15, characterized in that said connector is provided with a plurality of contact terminals to which core ends of different electrical wires may be soldered, and in that said pre-soldering tool further includes means for displacing said connector and thereby said contact terminals with respect to said core ends so as to bring each contact terminal and the corresponding core end at the height of the pressure means.

18. Soldering apparatus according to claim 12, characterized in that said inductive soldering tool is an oven including means for maintaining said connector and said wires in place during the soldering operation.

19. Soldering apparatus according to claim 18, characterized in that said oven further comprises a high frequency generator to provide said heat by induction.

20. Soldering apparatus according to claim 12, characterized in that said spoon is a tinplated spoon.

21. Soldering apparatus according to claim 12, characterized in that said core end of said electrical wire is silver coated.

22. Soldering apparatus according to claim 12, characterized in that said electrical wire forms part of a multiconductor cable.

* * * * *